(12) United States Patent
Himeno et al.

(10) Patent No.: US 9,599,227 B2
(45) Date of Patent: Mar. 21, 2017

(54) LIP SEAL

(75) Inventors: Nobuhiro Himeno, Toyama (JP);
Mashiba Kyogoku, Toyama (JP);
Masakazu Tamura, Toyama (JP)

(73) Assignee: WARTSILA JAPAN LTD., Kobe-shi (JP)

( * ) Notice: Subject to any disclaimer, the term of this patent is extended or adjusted under 35 U.S.C. 154(b) by 0 days.

(21) Appl. No.: 13/993,784

(22) PCT Filed: Dec. 14, 2011

(86) PCT No.: PCT/JP2011/078939
§ 371 (c)(1),
(2), (4) Date: Jun. 13, 2013

(87) PCT Pub. No.: WO2012/081630
PCT Pub. Date: Jun. 21, 2012

(65) Prior Publication Data
US 2013/0264777 A1    Oct. 10, 2013

(30) Foreign Application Priority Data

Dec. 16, 2010  (JP) ................... 2010-280649

(51) Int. Cl.
*F16J 15/32*  (2016.01)
*F16J 15/00*  (2006.01)
*F16J 15/46*  (2006.01)

(52) U.S. Cl.
CPC ............ *F16J 15/32* (2013.01); *F16J 15/002* (2013.01); *F16J 15/322* (2013.01); *F16J 15/3208* (2013.01); *F16J 15/46* (2013.01)

(58) Field of Classification Search
CPC .... F16J 15/324; F16J 15/3268; F16J 15/3284; F16J 15/3204; F16J 15/006; F16J 1/003
(Continued)

(56) References Cited

U.S. PATENT DOCUMENTS 3,637,222 A * 1/1972 Wilkinson .................... 277/553
3,687,464 A * 8/1972 Jackson et al. ............... 277/553
(Continued)

FOREIGN PATENT DOCUMENTS

JP    30-002105 A    2/1955
JP    50-015356 Y    5/1975
(Continued)

OTHER PUBLICATIONS

International Search Report for PCT/JP2011/078939, mailing date of Feb. 14, 2012.

*Primary Examiner* — Kristina Fulton
*Assistant Examiner* — Eugene G Byrd
(74) *Attorney, Agent, or Firm* — Westerman, Hattori, Daniels & Adrian, LLP

(57) ABSTRACT

A lip seal includes: a lip part (1) forming a ring shape alone or with plural members and provided in sliding contact with the entire periphery of a surface of a shaft (0); an elastic arm part (2) and a flexible wall (3) supporting the lip part (1) at a sliding contact position; key parts (4) connecting the elastic arm part (2) and the flexible wall (3) to a housing (10), respectively, and a pressure regulation chamber (A) forming a ring shape alone or with plural members and using the elastic arm part (2) and the flexible wall (3) as partition walls. The flexible wall (3) is deformed by the increase and decrease in pressure in the pressure regulation chamber (A) to change the lip part (1) at least radially.

12 Claims, 17 Drawing Sheets

(58) Field of Classification Search
USPC .................. 277/549, 552, 553, 558, 561
See application file for complete search history.

(56) References Cited

U.S. PATENT DOCUMENTS

| | | | |
|---|---|---|---|
| 4,198,064 A * | 4/1980 | Huhn | 277/558 |
| 4,337,956 A * | 7/1982 | Hopper | 277/552 |
| 4,401,306 A * | 8/1983 | Arnold | 277/558 |
| 5,411,273 A * | 5/1995 | Pietsch et al. | 277/309 |
| 5,429,374 A * | 7/1995 | Eichenberger | 277/552 |
| 6,886,834 B2 * | 5/2005 | Osako et al. | 277/558 |
| 7,640,841 B2 * | 1/2010 | An et al. | 92/168 |
| 2002/0117810 A1 * | 8/2002 | Schemm | 277/553 |
| 2004/0130101 A1 * | 7/2004 | Osako et al. | 277/549 |

FOREIGN PATENT DOCUMENTS

| | | |
|---|---|---|
| JP | 60-91847 U | 6/1985 |
| JP | 60-159298 A | 8/1985 |
| JP | 60-175700 A | 9/1985 |
| JP | 61-133168 U | 8/1986 |
| JP | 01-165367 U | 11/1989 |
| JP | 02-076267 U | 6/1990 |
| JP | 05-025069 U | 4/1993 |
| JP | 05-036166 U | 5/1993 |
| JP | 06-344984 A | 12/1994 |
| JP | 08-004776 A | 1/1996 |
| JP | 2001-324027 A | 11/2001 |
| JP | 2004-156702 A | 6/2004 |
| JP | 2010133100 A * | 6/2010 |

* cited by examiner

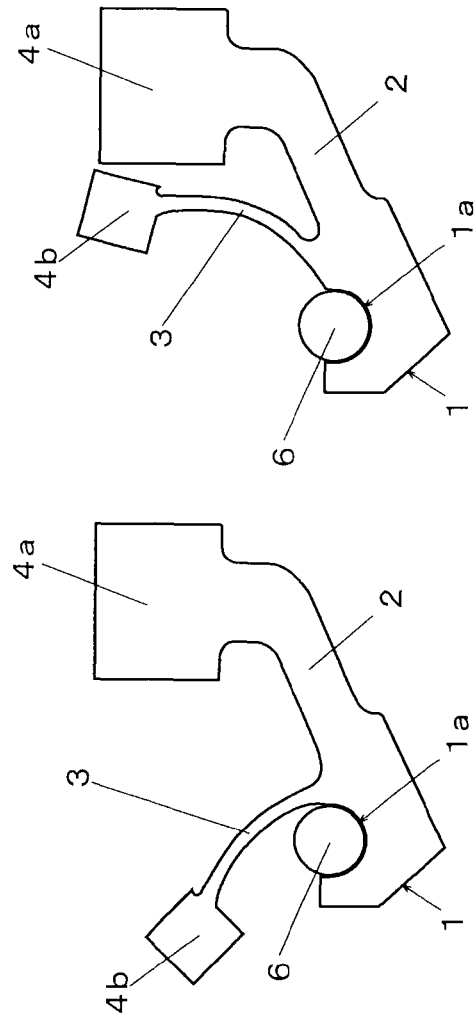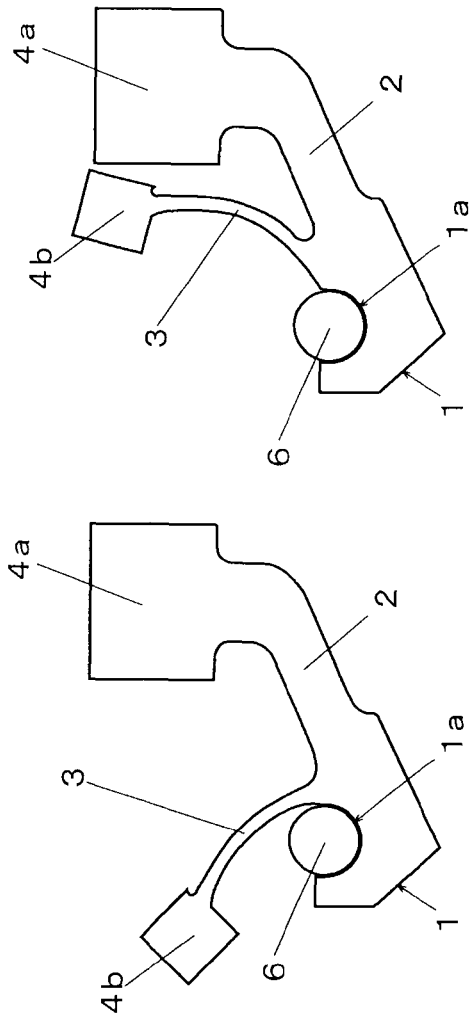

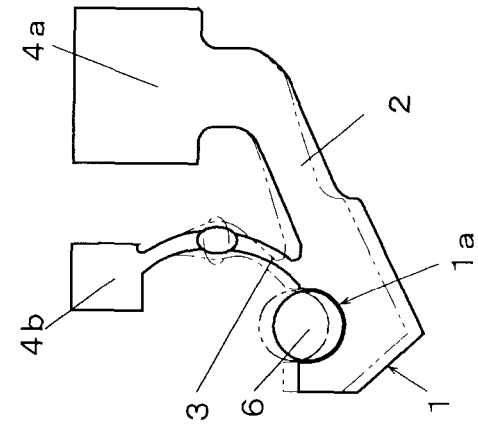
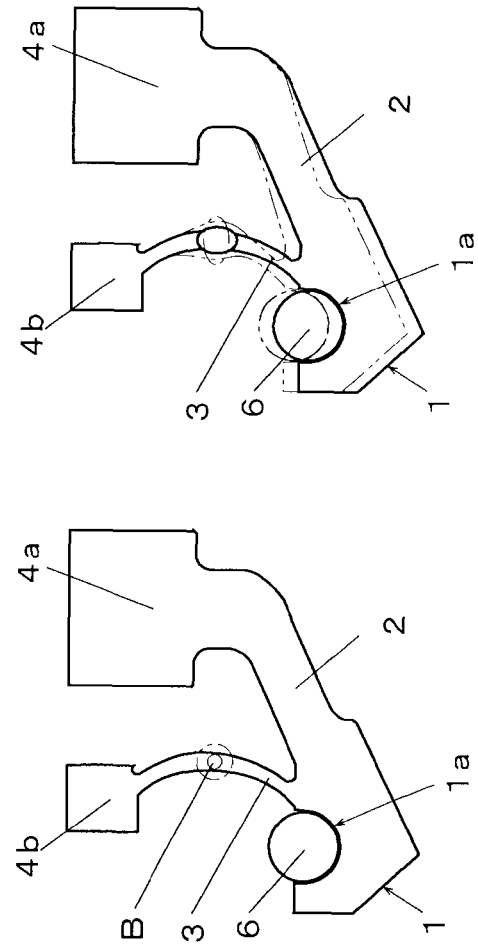

US 9,599,227 B2

LIP SEAL

TECHNICAL FIELD

The present invention relates to a lip seal provided in sliding contact with a shaft for securing the state in which the flow of a fluid is blocked.

BACKGROUND ART

A sealing device typified by a stern tube sealing device of a ship is provided for preventing the inconvenience in function caused due to the entry of a fluid such as sea water into a structure such as a hull and the outflow of the fluid from the inside, and has a single lip seal or multiple lip seals including an elastic body such as rubber or elastomer provided for a shaft hole through which a shaft is inserted.

A lip seal is slidably in hermetic contact with (hereinafter referred to as seals) a surface of a shaft and maintains the straining force on the shaft with the elastic force of the lip seal itself, the pressure applied by a spring or the like, a fluid pressure difference on front and back faces of the lip seal, or the like. As for the operation of the elastic force of the lip seal itself and the like, first, sealing is performed through elastic deformation of a lip part (for example, see Patent Document 1 below), second, sealing is performed while the value of an interference is adjusted by air spring type sealing (see, for example, Patent Document 2 below), and third, sealing is performed by a straining force applying means attached to the seal lip for applying a straining force to the lip seal for pressing the lip seal against a shaft (see, for example, Patent Document 3 or Patent Document 4 below).

CITATION LIST

Patent Documents

Patent Document 1: Japanese Examined Utility Model Application Publication No. S50-15356
Patent Document 2: Japanese Unexamined Utility Model Application Publication No. H5-36166
Patent Document 3: Japanese Unexamined Utility Model Application Publication No. H2-76267
Patent Document 4: Japanese Unexamined Utility Model Application Publication No. H5-25069

SUMMARY OF INVENTION

Technical Problem

However, according to the above methods, in the first method and the third method, the degree of contact of the lip seal with the surface of the shaft (hereinafter referred to as contact degree) simply depends on the elasticity of the lip seal or the capability of the straining force applying means, and in the second method, the contact degree also depends on the ambient temperature environment.

In the above circumstances, in the state that an excellent straining force cannot be maintained due to the abrasion of a slidable unit and the deterioration in elastic force of the lip seal itself after the long use so that the supporting condition of the shaft has deteriorated through vibration or the like and resulting in that the shaft deviation beyond the interference has occurred radially, a sufficient sealed state cannot be secured, which leads to a problem in which the sealed fluid flows out of the device or an external fluid enters the device.

The present invention has been made in view of the above circumstances, and has an object to provide a lip seal with a configuration capable of adjusting the contact degree actively as appropriate in accordance with the environment or the degree of abrasion of the lip seal, and to improve the lifetime of the lip seal and the sealing performance of the lip seal.

Solution to Problem

A lip seal according to the present invention made for solving the above problem includes: a lip part in sliding contact with the entire periphery of a surface of a shaft; an elastic arm part and a flexible wall which support the lip part at a sliding contact position; a key part connecting the elastic arm part and the flexible wall to a housing, respectively; and a ring-shaped pressure regulation chamber having the elastic arm part and the flexible wall as partition walls. Through the increase or decrease in pressure in the pressure regulation chamber, the flexible wall is deformed to cause the lip part to change at least radially with the shaft as a center, so that the straining force is adjusted and the sealed posture of the lip seal is adjusted. Here, the change includes deformation or deviation (advance or retreat) which contributes to the adjustment of the straining force.

For allowing the mode of the flexible wall to be changed individually, a pressure application chamber with a ring shape sharing the center with the pressure regulation chamber (A) may be provided inside the flexible wall. The pressure application chamber may be formed by uniformly forming a channel capable of feeding and discharging a fluid along a circumferential direction of the flexible wall, or any other method such as inserting an expandable/contractible tube forming such a channel.

The elastic arm part may have a configuration in which: the sectional shape is like an arc, a shape obtained by rotating a letter V by 90° clockwise, or a straight shape, the curvature of the arc formed by the elastic arm part, the bending angle of the letter V, or the mode of the straight shape (expansion and contraction, or the like) being changed by the pressure increase or decrease in the pressure regulation chamber. The flexible wall may employ a configuration in which: the sectional shape is like an arc, a shape obtained by rotating a letter V by approximately 90° clockwise, or a straight shape, the curvature of the arc formed by the flexible wall, the bending angle of the letter V, or the mode of the straight shape being changed by the pressure increase or decrease in the pressure regulation chamber. The configuration of the lip seal may be determined by employing the above configuration as appropriate or by combining the above configurations.

Moreover, a fiber or resin film or a material similar thereto which is expected to have the operation below (hereinafter referred to as fiber or the like) may be attached to or internally provided for an inner surface or an outer surface of the flexible wall, the key part, or the elastic arm part and the expansion or contraction on the side provided with the fiber or the like may be suppressed or the strength may be partially increased, so that the mode of flexibility of the flexible wall or the elastic arm part is controlled in terms of the configuration. Moreover, the lip part may be provided with a straining force applying means for applying a straining force to the shaft of the lip part, such as a spring or a ring-shaped spring, so that the straining force can be adjusted in view of the elasticity of the elastic arm part.

A lip seal according to the present invention may be formed using a single member or a plurality of members (for example, a member having a shape obtained by dividing a ring shape) which is connected in a ring shape formed at the time of usage to form the appearance of a body of axial symmetry together with the pressure regulation chamber or the pressure application chamber.

Advantageous Effects of Invention

The lip seal according to the present invention has the configuration in which the ring-shaped pressure regulation chamber is formed using the elastic arm part and the flexible wall as partition walls, so that the flexible wall is deformed by increase or decrease in pressure in the pressure regulation chamber. This causes the lip part to change at least radially, thereby adjusting the straining force or interference. As a result, the contact degree can be actively adjusted as appropriate in accordance with the environment or the abrasion degree of the lip seal. Further, the outflow of the sealed fluid or the entry of the external fluid due to the pressure change can be prevented.

The use of the configuration having the pressure application chamber inside the flexible wall allows the modification of the flexible wall, and the amount of change of the lip part, the change of pressure inside the pressure regulation chamber required for a certain amount of change of the lip part, or the like (specification of the lip part) can be adjusted without exchanging the lip seal. With this adjustment, the fatigue of the elastic arm part due to the aging can be suppressed.

When the arc shape or the shape obtained by rotating a letter V by approximately 90° clockwise is employed as the sectional shape of the elastic arm part, the curvature of the arc shape, the bending angle of the letter V, or the straight mode formed by the flexible wall can be changed by the increase or decrease of the pressure inside the pressure regulation chamber. Thus, the flexible wall can have a role as a link for advancing or retreating the lip part relative to the shaft.

Moreover, the fiber or the like may be attached to or internally provided for the inner surface or the outer surface of the flexible wall, the key part, or the elastic arm part and the expansion or contraction on the side provided with the fiber or the like is suppressed or the strength is partially increased, so that the mode of flexibility of the flexible wall or the elastic arm part can be controlled in terms of the configuration. As a result, the mode change of the flexible wall or the elastic arm part due to the change in pressure in the pressure regulation chamber can be stabilized and the amount of change and the direction of the change, and the like of the lip part relative to the shaft can be stabilized.

Moreover, the lip part may be provided with the straining force applying means for applying a straining force to the shaft of the lip part, so that the straining force can be adjusted in view of the elasticity of the elastic arm part. For example, even though the abrasion of the lip part and the like has progressed, the lack of the straining force against the shaft can be compensated with just the operation of the pressure regulation chamber or the pressure application chamber.

BRIEF DESCRIPTION OF DRAWINGS

FIG. 3 are vertical sectional views depicting one example of the operation of the lip seal according to the present invention.

FIG. 11 are vertical sectional views depicting an example of the lip seal according to the present invention: FIG. 11A depicts a configuration for achieving the operation for drawing the elastic arm part outward; and FIG. 11B depicts a configuration for achieving the operation for pushing out the elastic arm part inward.

FIG. 14 are vertical sectional views depicting an example of the lip seal according to the present invention: FIG. 14A depicts the state at normal time; and FIG. 14B depicts the state where the pressure is regulated in the pressure application chamber.

DESCRIPTION OF EMBODIMENTS

Figure 1:
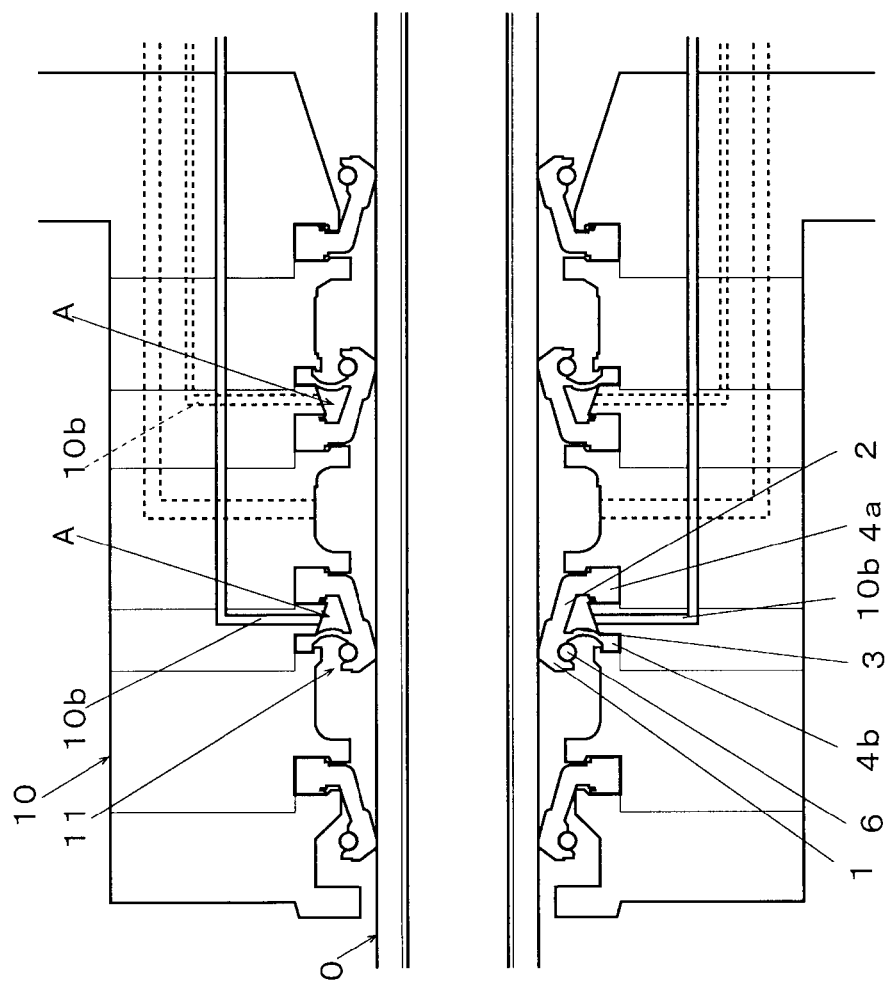
FIG. 1 is a vertical sectional view depicting an embodiment of a lip seal according to the present invention.

An embodiment of a lip seal according to the present invention is described with reference to the drawings. FIG. 1 depicts an example in which the lip seal according to the present invention is applied to a stern tube sealing device. In the stern tube sealing device depicted in FIG. 1, a lip seal 11 with a ring shape is fixed in a shaft hole of a housing 10 so that a lip part 1 thereof is in contact with the entire periphery of a surface of a shaft 0. The ring shape of the lip seal 11 may be formed by the lip seal 11 with the ring shape alone, or may be formed by connection of plural lip seals 11 with an arc shape.

Figure 2A:
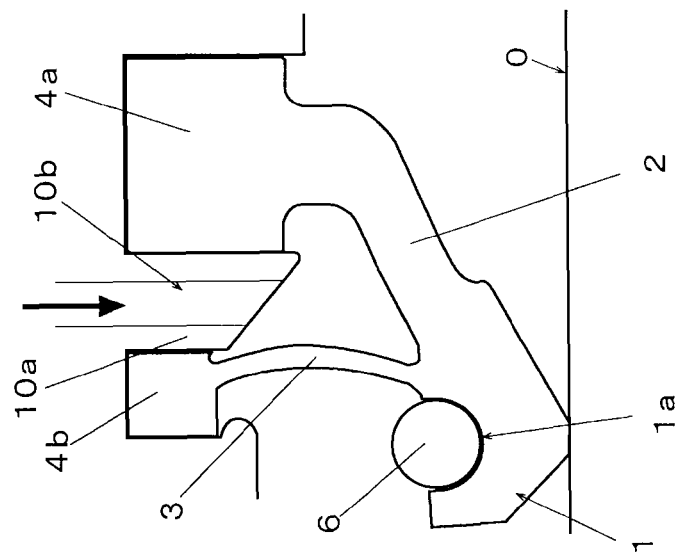
FIGS. 2A and 2B are magnified views each depicting an example of the operation of the pressure regulation chamber A of FIG. 1.
Figure 2B:
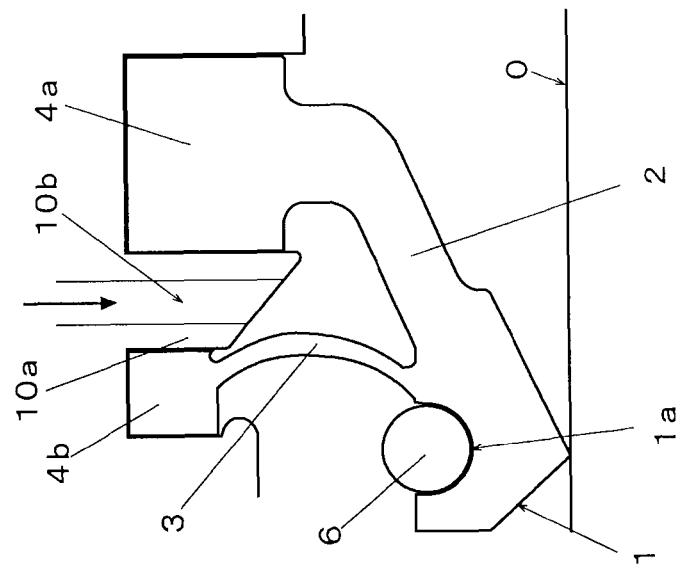
Figure 3A:
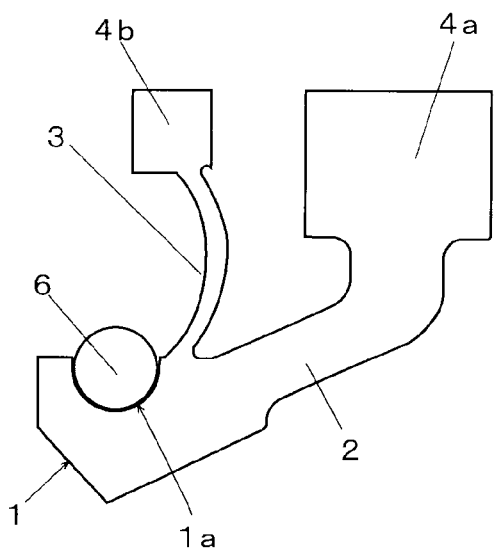
FIG. 3A is a diagram at the time of restoration.
Figure 3B:
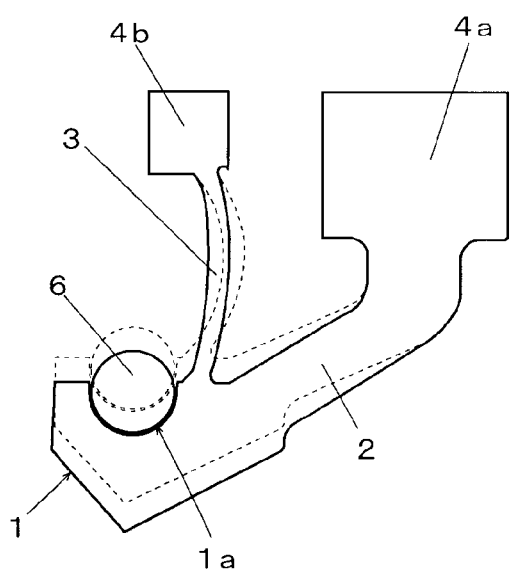
FIG. 3B is a diagram at the time of pressure application.
Figure 3C:
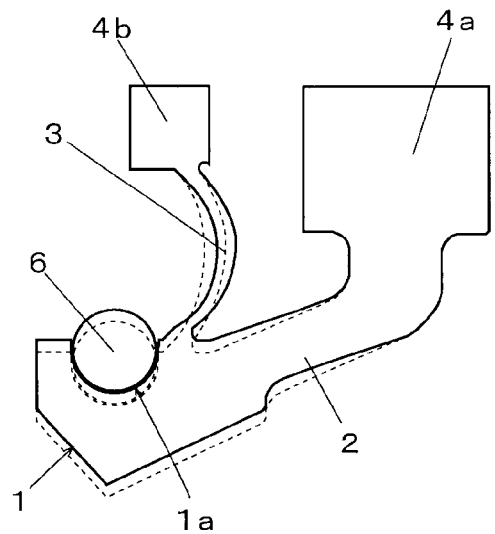
FIG. 3C is a diagram at the time of reduced pressure.

The embodiment of the lip seal is specifically described with reference to the drawings. FIG. 2 and FIG. 3 depict an example of a ring-shaped elastic body formed of rubber, elastomer, or the like, which corresponds to a body of axial symmetry formed by rotating a shape by 360° around the shaft 0, the shape being formed integrally by the lip part 1 in sliding contact with the surface of the shaft 0, an elastic arm part 2 and a flexible wall 3 which support the lip part 1 at the sliding contact position, and key parts 4 (or 4a and 4b) connecting the elastic arm part 2 and the flexible wall 3 to the housing 10, respectively.

The lip part 1 in this example employs a tapering mode as a contact plane to be in contact with the shaft 0. The elastic arm part 2 extends from an end face of the lip part 1 outward in any direction of longitudinal directions of the shaft 0 to be in sliding contact (hereinafter, front and back directions) (direction apart from the shaft 0), and draws a curve with an arc shape or a shape obtained by rotating a letter V by approximately 90° clockwise toward the key part 4 (or 4*a*) located at the outermost position of the lip seal. Note that the mode of the elastic arm part 2 is not limited to the configuration in which the curve is drawn but the configuration in which the elastic arm part 2 extends outward from the side face of the lip part 1 in any of the front and back directions in an approximately linear manner toward the key part 4 (or 4*a*) located at the outermost position of the lip seal may also be employed.

The flexible wall 3 rises from the outer surface of the lip part 1 (side facing the housing 10) to the outside of the sliding contact position, and its end part is provided with the key part 4 (or 4*b*).

The elastic arm part 2 and the flexible wall 3 (including the key parts 4 (or 4*a* and 4*b*) as necessary) form the ring-shaped pressure regulation chamber A using each part as a partition wall, and the pressure regulation chamber A expands or contracts according to the increase or decrease of the pressure inside the pressure regulation chamber A. Through the deformation of the pressure regulation chamber A, the elastic arm part 2 and the flexible wall 3 deform to cause the lip part 1 supported by the elastic arm part 2 to change outward or inward.

Note that when the configuration in which the lip seal 11 forms the ring shape alone is employed, the space of the single ring shape or the space of the ring shape obtained by dividing the space with separation walls serves as the pressure regulation chamber A. Meanwhile, when the configuration in which the plural lip seals 11 are connected to form the ring shape is employed, the individual lip seal forming the ring shape includes the pressure regulation chamber A with its both sides in the circumferential direction open, or the pressure regulation chamber A with its one side or both sides in the circumferential direction closed by the partition wall.

In a first embodiment depicted in FIG. 2 and FIG. 3, the key parts 4 are separated back and forth into the main key 4*a* connected to the elastic arm part 2 and the subkey 4*b* connected to the flexible wall 3, and a protrusion 10*a* of the housing 10 projecting into the shaft hole is fitted to the space between the main key 4*a* and the subkey 4*b*. In this example, the sectional shape of the elastic arm part 2 is like a shape obtained by rotating a letter V by approximately 90° clockwise, the sectional shape of the flexible wall 3 is like an arc, and the flexible wall 3 is thinner than the elastic arm part 2.

Figure 4:
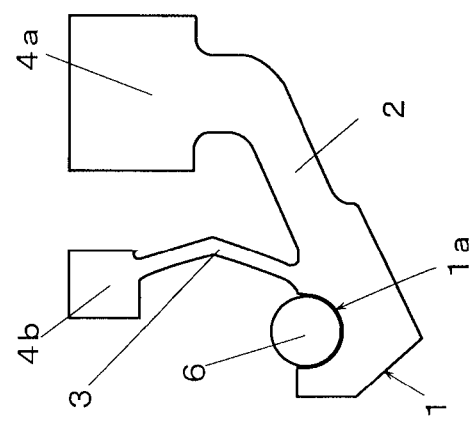
FIG. 4 is a vertical sectional view depicting an example of the lip seal according to the present invention.
Figure 5:
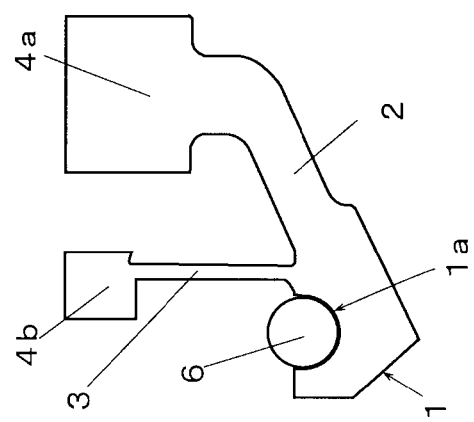
FIG. 5 is a vertical sectional view depicting an example of the lip seal according to the present invention.
Figure 6:
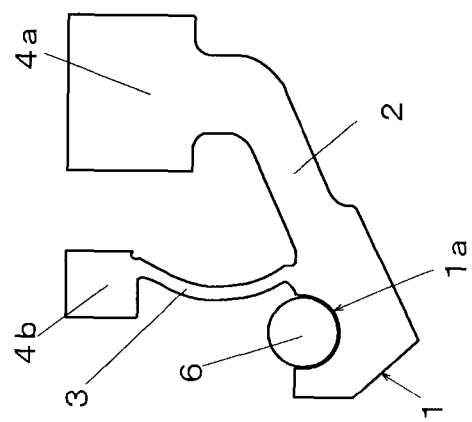
FIG. 6 is a vertical sectional view depicting an example of the lip seal according to the present invention.

FIG. 4 depicts a second embodiment in which the sectional shape of the flexible wall 3 is like a shape obtained by rotating a letter V by approximately 90° clockwise. FIG. 5 depicts a third embodiment in which the sectional shape of the flexible wall 3 is linear, and FIG. 6 depicts a fourth embodiment in which the curving direction of the flexible wall 3 in the first embodiment is inverted.

In the second embodiment, the flexible wall 3 is deformed by increasing the pressure to the pressure regulation chamber A from the prescribed internal pressure to increase the straining force of the lip part 1 against the shaft 0 as long as the expansion and contraction of the flexible wall 3 are suppressed in terms of the material and the configuration. Upon the block or decrease of the pressure applied (or if the pressure becomes negative), the straining force of the lip part 1 against the shaft 0 is reduced (see FIG. 4).

In the third embodiment, the flexible wall 3 is deformed by reducing pressure of the pressure regulation chamber A from the prescribed internal pressure to reduce the straining force of the lip part 1 against the shaft 0 as long as the expansion and contraction of the flexible wall 3 are suppressed in terms of the material and the configuration. Upon the increase of the pressure, the straining force of the lip part 1 against the shaft 0 is increased (see FIG. 5).

In the fourth embodiment, the flexible wall 3 is deformed from the curved state to the linear form once by reducing pressure of the pressure regulation chamber A from the prescribed internal pressure (or setting the pressure negative) to increase the straining force of the lip part 1 against the shaft 0 as long as the expansion and contraction of the flexible wall 3 are suppressed in terms of the material and the configuration. Upon the further decrease of the pressure (or setting the pressure more negative), the flexible wall 3 is deformed again from the linear form to the curved state to reduce the straining force of the lip part 1 against the shaft 0. Upon the block of the reduced pressure (or if the negative pressure state is cancelled), the straining force of the lip part 1 against the shaft 0 is reduced (see FIG. 6).

The attaching angle of the flexible wall 3 can also be changed, in which case the configuration for achieving the operation for drawing the elastic arm part 2 outward (see FIG. 11A) or the configuration for achieving the operation for pushing out the elastic arm part 2 inward (see FIG. 11B) when the pressure is not applied to the pressure regulation chamber A (at normal time) can be employed.

Figure 7:
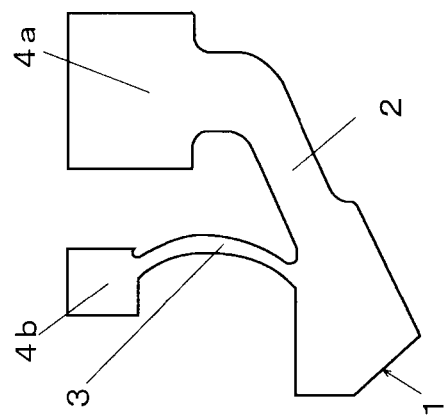
FIG. 7 is a vertical sectional view depicting an example of the lip seal according to the present invention.

In the case where a spring is attached as a straining force applying means 6 which applies the straining force between the lip part 1 and the shaft 0 outside the pressure regulation chamber A at the lip part 1 (at a tip of the elastic arm part in FIG. 2 and FIG. 3), the entire periphery of the outer surface of the lip part 1 is provided with a holding groove 1*a* for having the spring attached. The straining force applying means 6 may be other than the spring, and for example, may be an elastic thing with a ring shape. Note that a fifth embodiment depicted in FIG. 7 is an example in which the straining force applying means 6 of the first embodiment is not provided.

Figure 8:
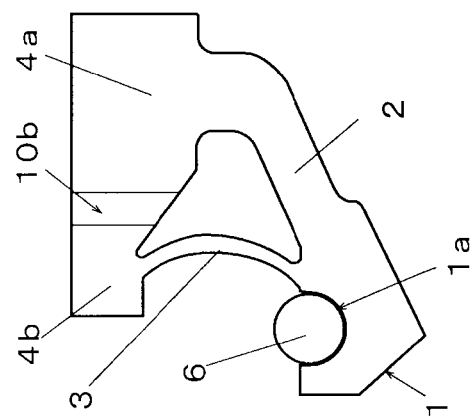
FIG. 8 is a vertical sectional view depicting an example of the lip seal according to the present invention.
Figure 9:
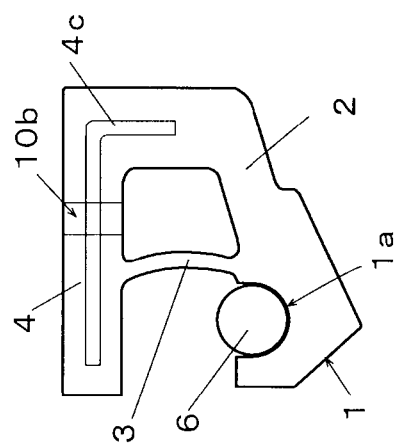
FIG. 9 is a vertical sectional view depicting an example of the lip seal according to the present invention.

In a sixth embodiment depicted in FIG. 8 and a seventh embodiment depicted in FIG. 9, the main key 4*a* and the subkey 4*b* in the first embodiment are integrally formed to form a channel 10*b* through which a fluid to fill the pressure regulation chamber A flows, and in the seventh embodiment, the key parts 4 are further provided with a shape-keeping and reinforcing frame 4*c*.

Figure 10:
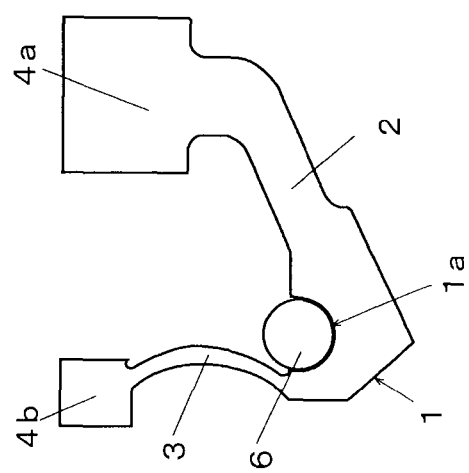
FIG. 10 is a vertical sectional view depicting an example of the lip seal according to the present invention.

In an eighth embodiment depicted in FIG. 10, the flexible wall 3 of the first embodiment is provided on an opposite side with respect to the holding groove 1*a*, so that the straining force applying means (spring in this embodiment) 6 is provided inside the pressure regulation chamber A.

According to the above embodiments, the expansion and contraction of the pressure regulation chamber A occur mainly based on the change of the curvature of the arc shape formed by the flexible wall 3 or the change of the bending angle of the letter V through the increase or decrease of the pressure in the pressure regulation chamber A, and the expansion and contraction of the linear distance between inner and outer ends of the flexible wall 3 due to the change of the curvature and the like play a role as a link of advancing or retreating the lip part 1 relative to the shaft 0 (see FIG. 3). That is, as compared with the case in which the abrasion or deterioration is not caused in the lip part 1, when the abrasion or deterioration is caused, the lip part 1 is advanced inward by the amount of the abrasion by increasing the pressure in the pressure regulation chamber A, and the inward straining force enough to bring the lip part 1 in sliding contact with the shaft 0 is applied (see FIG. 2).

Figure 12:
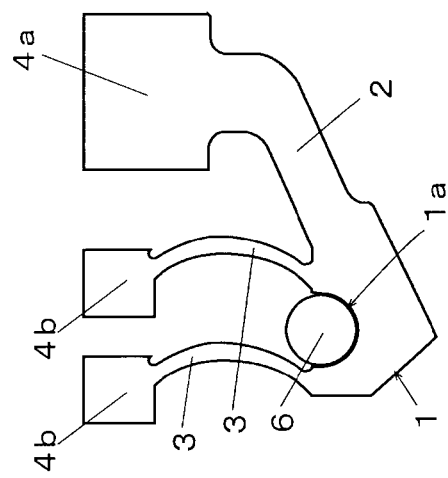
FIG. 12 is a vertical sectional view depicting an example of the lip seal according to the present invention.

In a ninth embodiment depicted in FIG. 12, the number of the flexible walls 3 of the first embodiment is set to two. In this example, the holding groove 1*a* is provided between the flexible walls 3 and the straining force applying means 6 is attached to the holding groove 1*a*. Thus, the straining force applying means 6 is separated from the outside of the pressure regulation chamber A, and by selecting the fluid flowing through the pressure regulation chamber A as appropriate, the lifetime can be extended.

Figure 13:
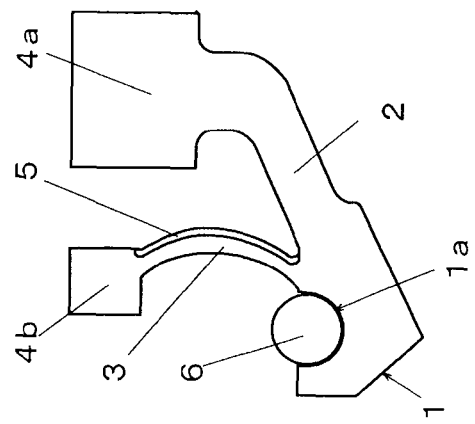
FIG. 13 is a vertical sectional view depicting an example of the lip seal according to the present invention.

In a tenth embodiment depicted in FIG. 13, a fiber or a film or a material which can be expected to have an operation similar thereto is attached to or provided internally for the inner surface or the outer surface of the flexible wall 3 (hereinafter, this part is referred to as a composite part 5). The material of the fiber and the film, the arrangement of the fiber, the thickness of the fiber, woven or nonwoven, the thickness of the composite part 5, and the like may be selected as appropriate depending on the range of the pressure to be applied to the pressure regulation chamber A, the targeted modification of the flexible wall 3, or such purposes as suppressing the expansion or contraction of the flexible wall 3 in terms of the material or the configuration and giving a repelling property (spring property), or the like. Note that the composite part 5 may be provided for a part of the inner surface or the outer surface of the subkey 4*b*, the elastic arm part 2, or the main key 4*a*.

An eleventh embodiment depicted in FIG. 14 is an example in which a pressure application chamber B is provided inside the flexible wall 3. In this example, a ring-shaped expandable/contractible pipe is formed along the entire periphery of an intermediate part in inner and outer directions of the flexible wall 3, and by adjusting the pressure in the pressure application chamber B, the mode of the flexible wall 3 can be changed and the straining force can be adjusted (see FIG. 14A). Along with this, the fatigue of the elastic arm part 2 due to the aging can be controlled (see FIG. 14B). Note that the ring shape formed by the pressure application chamber B may be formed by a single space provided for the flexible wall 3 of the lip seal 11 with the ring shape, or be formed by connection of plural arc spaces provided for the flexible wall 3 of the arc lip seal 11.

Figure 15:
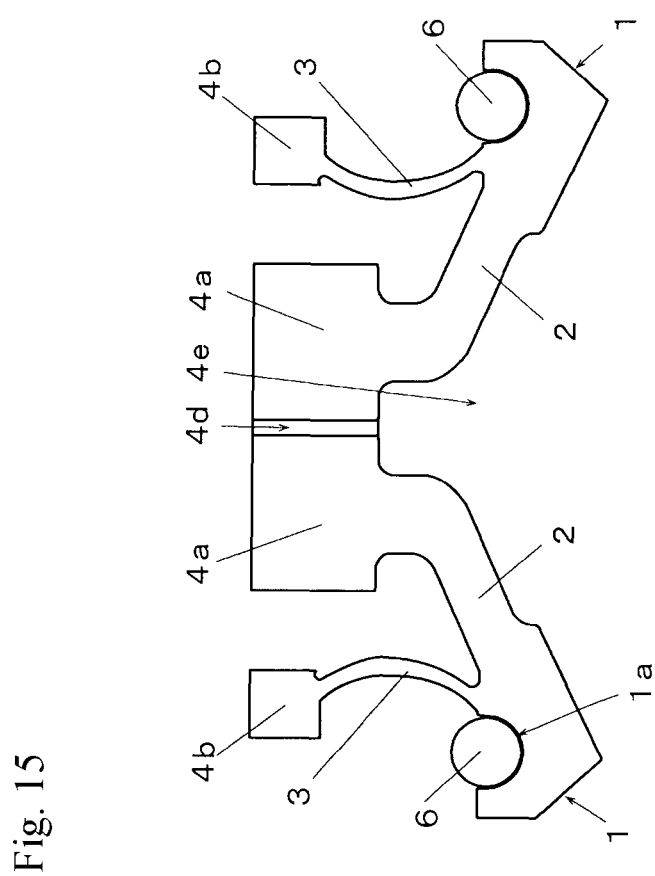
FIG. 15 is a vertical sectional view depicting an example of the lip seal according to the present invention.
Figure 16:
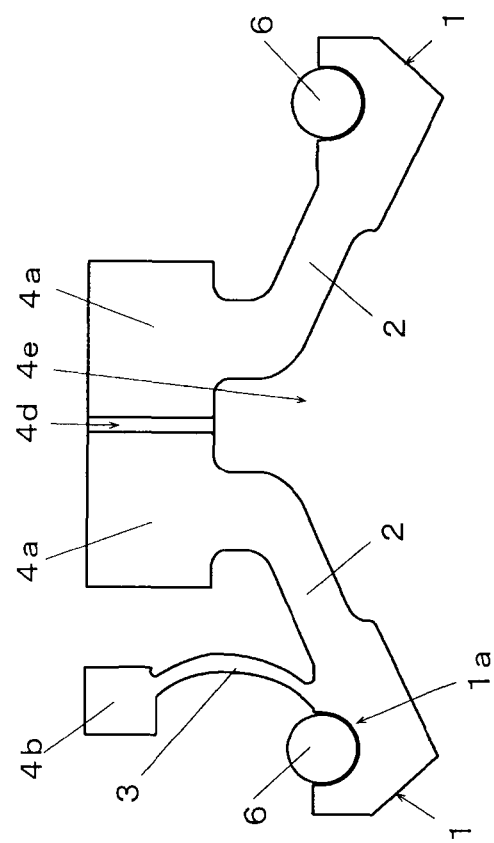
FIG. 16 is a vertical sectional view depicting an example of the lip seal according to the present invention.
Figure 17:
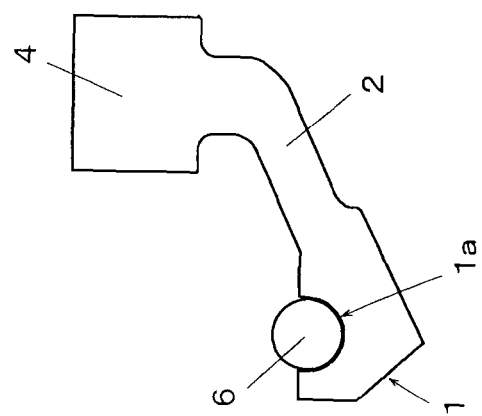
FIG. 17 is a vertical sectional view depicting an example of a conventional lip seal.

In a twelfth embodiment and a thirteenth embodiment depicted in FIG. 15 and FIG. 16, a pair of lip parts 1 is provided for one lip seal, and a leak path 4*d* for feeding or discharging a fluid flowing through a space 4*e* existing between the shaft 0 and the lip seal is provided for the connection part between the pair of lip parts 1. In this example, the two lip seals are integrally connected to achieve this. In the twelfth embodiment, a pair of the first embodiments is connected back to back, and in the thirteenth embodiment, the lip seal including the flexible wall 3 and the conventional lip seal (see FIG. 17) are integrally connected.

REFERENCE SIGNS LIST

0 shaft
1 lip part
1*a* holding groove
2 elastic arm part
3 flexible wall
4 key part
4*a* main key
4*b* subkey
4*c* frame
4*d* leak path
4*e* space
5 composite part
6 straining force applying means
10 housing
10*a* projection
10*b* channel
11 lip seal
A pressure regulation chamber
B pressure application chamber

The invention claimed is:

1. A lip seal comprising:
   a lip part in sliding contact with an entire periphery of a surface of a shaft;
   an elastic arm part and a flexible wall supporting the lip part at a sliding contact position;
   key parts connecting the elastic arm part and the flexible wall to a housing, respectively, and each having a ring shape;
   a pressure regulation chamber with a ring shape using the elastic arm part and the flexible wall as partition walls, wherein the flexible wall deforms due to increase or decrease in pressure in the pressure regulation chamber to cause the lip part to change at least radially with the shaft as a center;
   wherein said elastic arm part extends from said key parts connecting the elastic arm part to said housing from an elastic-arm housing connection point with said elastic arm part extending at an acute angle to said surface of said shaft with said lip being substantially laterally displaced along a lengthwise direction of the shaft from said elastic-arm housing connection point due to said acute angle, and wherein said flexible wall extends from said key parts connecting the flexible wall to said housing from a flexible-wall housing connection point to an elastic-arm flexible wall connection point, wherein said flexible-wall housing connection point and said elastic-arm flexible wall connection point are substantially laterally aligned along the lengthwise direction of the shaft.

2. The lip seal according to claim 1, further comprising a pressure application chamber with a ring shape sharing the same center as the pressure regulation chamber inside the flexible wall.

3. The lip seal according to claim 1, wherein a sectional shape of the elastic arm part is like an arc, a shape obtained by rotating a letter V by approximately 90° clockwise, or a straight shape, the curvature of the arc formed by the elastic arm part or the bending angle of the letter V being changed by pressure increase or decrease in the pressure regulation chamber.

4. The lip seal according to claim 1, wherein a sectional shape of the flexible wall is like an arc, a shape obtained by rotating a letter V by approximately 90° clockwise, or a straight shape, the curvature of the arc formed by the flexible wall or the bending angle of the letter V being changed by pressure increase or decrease in the pressure regulation chamber.

5. The lip seal according to claim 1, wherein an inner surface or an outer surface of the flexible wall or the elastic arm part is provided with a composite part.

6. The lip seal according to claim 1, wherein the lip part is provided with straining force applying means for applying a straining force between the lip part and the shaft.

7. The lip seal according to claim 1, wherein the lip seal is formed by connecting a plurality of members in a ring shape.

8. The lip seal according to claim 1, further including a fluid pressure supply tube supplying pressurized fluid to said pressure regulation chamber from a pressure source.

9. The lip seal according to claim 1, further including a straining force applying means applying a straining force between the lip part and the shaft which is located at an exterior side of said flexible wall and outside of said pressure regulating chamber.

10. The lip seal according to claim 9, wherein said straining force applying means is a spring.

11. The lip seal according to claim 1, wherein said the flexible wall is substantially thinner than said elastic arm part.

12. The lip seal according to claim 2, wherein said pressure application chamber with a ring shape is formed around the entire periphery of an intermediate part of the flexible wall and wherein adjusting of pressure in the pressure application chamber changes a mode of the flexible wall and adjusts the straining force applied.

* * * * *